(12) United States Patent
Donath et al.

(10) Patent No.: US 6,200,476 B1
(45) Date of Patent: Mar. 13, 2001

(54) METHOD AN DEVICE FOR INTRODUCING OXYGEN INTO WATER OR AQUEOUS SOLUTIONS

(75) Inventors: Sabine Donath, Oberhausen; Monica Hermans, Neuss, both of (DE)

(73) Assignee: Messer Griesheim GmbH (DE)

( * ) Notice: Subject to any disclaimer, the term of this patent is extended or adjusted under 35 U.S.C. 154(b) by 0 days.

(21) Appl. No.: 09/355,230

(22) PCT Filed: Jan. 13, 1998

(86) PCT No.: PCT/EP98/00150

§ 371 Date: Jul. 26, 1999

§ 102(e) Date: Jul. 26, 1999

(87) PCT Pub. No.: WO98/38135

PCT Pub. Date: Sep. 3, 1998

(30) Foreign Application Priority Data

Feb. 25, 1997 (DE) .............................. 197 07 425

(51) Int. Cl.⁷ ..................................... C02F 3/02
(52) U.S. Cl. ............... 210/629; 261/77; 261/94; 422/900; 210/758; 210/221.2
(58) Field of Search ................... 210/629, 630, 210/758, 221.2; 261/76, 77, 94; 42/900

(56) References Cited

U.S. PATENT DOCUMENTS

| | | | |
|---|---|---|---|
| 2,815,943 | * 12/1957 | Lamb . | |
| 4,060,486 | * 11/1977 | Schreiber . | |
| 4,165,286 | * 8/1979 | Schreiber . | |
| 4,267,052 | * 5/1981 | Chang | 210/629 |
| 4,489,016 | * 12/1984 | Kriebel . | |
| 4,818,446 | * 4/1989 | Schreiber . | |
| 5,299,885 | * 4/1994 | Prassas . | |
| 5,356,600 | * 10/1994 | Kiyonaga . | |
| 5,599,452 | * 2/1997 | MacLaren | 210/615 |
| 5,766,490 | * 6/1998 | Taylor . | |
| 5,902,976 | * 5/1999 | Beasley . | |
| 5,994,567 | * 11/1999 | Kingsley . | |

FOREIGN PATENT DOCUMENTS 0 302 708 * 2/1989 (EP) .
0 302 708 * 6/1989 (EP) .

* cited by examiner

Primary Examiner—Chester T. Barry
(74) Attorney, Agent, or Firm—Connolly Bove Lodge & Hutz, LLP

(57) ABSTRACT

In a process for transferring oxygen or an oxygen-containing gas into water or aqueous solutions in the treatment of water or aqueous solutions, oxygen or an oxygen-containing gas is added to the water or aqueous solution continuously or at intervals through an injector and simultaneously through at least one tube sparger.

15 Claims, No Drawings

METHOD AN DEVICE FOR INTRODUCING OXYGEN INTO WATER OR AQUEOUS SOLUTIONS

The invention relates to a process and a device for transferring oxygen into water or aqueous solutions in accordance with the preamble of claim 1.

In many areas of the treatment of water or aqueous solutions, it is necessary or advantageous to additionally introduce oxygen into the aqueous system. Processes for treating water or aqueous solutions are, for example, processes in wastewater treatment, wastewater purification, drinking water treatment, in the protection of water bodies or in fish farming. For an economical oxidation procedure, the oxygen transfer, that is the ratio of the amount of oxygen dissolved to the amount of oxygen supplied, must be as high as possible, but the energy expended on dissolving the oxygen must at the same time be as low as possible.

Thus, in wastewater purification processes in sewage treatment plants using the so-called activated sludge process, in which the various water constituents are oxidatively broken down or in part used to synthesize new biomass in a first process stage, the so-called activation stage, by microorganisms (bacteria) suspended in the wastewater in an activation tank, the aqueous solution (wastewater) is aerated and sometimes oxygen is additionally supplied. The air or oxygen is introduced by aeration equipment such as candle aerators or disk aerators. Sewage treatment plants and processes of this type are described, for example, in "Abwassertechnik" [wastewater engineering], Hosang and Bischof, 9th edition, Verlag B. G. Teubner, 1989. Tightening of the legal requirements of wastewater purification and, possibly, increase in the dirt loading of the wastewater, frequently necessitates expansion and improvement of existing sewage treatment plants, which leads to additional oxygen transfer often being required. This can be achieved by conventional aeration equipment, for example candle aerators or disk aerators, an oxygenator or by tube spargers or injectors. The term "oxygenator" is taken to mean here a pressure vessel through which water flows; the term "tube sparger" is used here for a perforated tube; the term "injector" denotes a device which fundamentally consists of a pump, a Venturi tube and a mixing section, which is equipped, for example, with mixing nozzles and mixing tubes.

The object underlying the invention is to improve the process mentioned at the outset in such a manner that the oxygen transfer is maximized and at the same time the additional energy expenditure is relatively low.

This object is achieved by adding oxygen or an oxygen-containing gas to the water or aqueous solution continuously or at intervals through an injector and simultaneously at least one tube sparger. Surprisingly, it has been found that the technical advantage achieved by this combination is greater than the alternative use of the individual devices (injector or tube sparger). This synergistic effect is surprising, since the overall efficiency is markedly above that of the partial systems. The additional energy requirement in this case is minimal and the economically expedient control range between maximum and minimum oxygen feed is relatively large. The optimum oxygen content and the optimum rate of oxygen to be fed are dependent on the water or aqueous solution to be treated and the specific mode of operation of the plant in which the claimed process is used, and can be determined for the respective boundary conditions by a few simple experiments. A further advantage is that the tube spargers and injectors give rise to only relatively low capital costs.

The oxygen-containing gas used is preferably pure oxygen. The term "pure oxygen" means here oxygen which has a minimum purity of approximately 80% by volume. For example, technical-grade oxygen which is produced by liquefying air and typically complies with the purity specification "oxygen 2.01" (minimum purity 99% by volume) or "oxygen 2.5" (minimum purity 99.5% by volume) can be used. Use of such technical-grade purity oxygen gases is possible if this permits an economic procedure to be achieved.

According to the invention, the ratio of the volumetric flow rates of the oxygen or oxygen-containing gas added via the injector to the oxygen or oxygen-containing gas added via the tube sparger is 10:1 to 1:10.

It is provided according to the invention that the volumetric flow rate of the oxygen or oxygen-containing gas added via the injector is 0.01 to 0.5 $m^3$ (S.T.P.)/h per $m^3$ of water or aqueous solution and/or that the volumetric flow rate of the oxygen or oxygen-containing gas added via the tube sparger is 0.01 to 0.4 $m^3$ (S.T.P.)/h per $m^3$ of water or aqueous solution.

According to the invention, the oxygen-containing gas or oxygen is fed to the wastewater in the activation stage in a biological wastewater purification plant. Preferably, the injector and the tube sparger are then arranged in the aerobic region at the bottom of the activation tank of the biological wastewater purification plant.

According to the invention, the water enriched with oxygen in the injector flows via one or more mixing nozzles into the tank containing the water lower in oxygen and/or the oxygen-enriched water is mixed with the tank water lower in oxygen via one or more mixing tubes.

The oxygen-containing gas or pure oxygen can be fed via all conventional supply methods, for example liquid storage tank, on-site processes or a pipe from a network. The term "on-site processes" here means processes in which oxygen is produced from the ambient air directly on the site of oxygen consumption. Supply via a pipe from a network is preferred, since it makes possible relatively high operating safety and high security of supply for a relatively low expenditure on equipment and small space requirement. The oxygen supply can advantageously be connected to the device for transferring the oxygen to the water or aqueous solution by an elastomer tube, in order to simplify assembly.

For certain applications it is advantageous that the oxygen-containing gas or pure oxygen replaces the conventional aeration only at intervals, but preferably for 5 to 50 minutes per hour. Preferably, the oxygen-containing gas or oxygen replaces the conventional aeration of a biological wastewater purification plant in the case of an increased hydraulic loading, which can occur, for example, as the result of a rainfall event.

It is likewise provided according to the invention that the oxygen-containing gas or oxygen is fed to the wastewater in addition to the conventional aeration in the event of a higher pollutant loading of the wastewater or in the event of an increased energy requirement of the biological wastewater purification plant.

The object underlying the invention is further achieved by a device in which the oxygen or an oxygen-containing gas is fed through an injector and simultaneously through at least one tube sparger, two conical funnels having a perforated and/or slotted middle piece and a sleeve arranged on the middle piece for gas feed being assigned to the Venturi tube of the injector. The sleeve advantageously has a socket or a flange for connecting a tube or pipe for feeding the oxygen.

It is further provided according to the invention to use, instead of the described Venturi tube, a liquid jet gas compressor which can take in the gas at atmospheric pressure or slight superatmospheric pressure, for example at a superatmospheric pressure up to 100 mbar. The term "liquid jet gas compressor" is taken to mean here jet pumps for transporting and compressing gases with simultaneous intense mixing with the propellant fluid. They consist of a head piece, exchangeable propellant nozzle with swirl body and diffuser.

The tube sparger preferably consists of a perforated elastomer tube in which the orifices for the outflow of the oxygen-containing gas or oxygen are not formed until an overpressure in the tube interior of approximately 0.2 to 0.5 bar is reached. This has the advantage that the orifices cannot become blocked even when no oxygen-containing gas or oxygen is flowing out from the orifices.

According to the invention, downstream of the injector is arranged a pipe on which are arranged one or more mixing nozzles and/or one or more mixing tubes. Upstream of this pipe, advantageously, can be provided a further pipe as absorption section for increasing the oxygen transfer.

According to the invention it is provided that additional internals or changes in cross-section of the pipe inner diameter are arranged in the pipe downstream of the injector to increase the turbulence in the flow profile. This causes an improved dispersion or very fine distribution of the gas bubbles. According to the invention, a static mixer can further also be arranged in the pipe downstream of the injector to increase the turbulence in the flow profile. The mixer has three-dimensional internals to modify the flow in such a manner that oxygen bubbles are more intensively subdivided.

EXAMPLES

In a test tank containing pure water and at a water depth of 2 m, to achieve the same amount of dissolved oxygen, 244 kg/h of oxygen needed to be transferred with sole use of tube spargers, and 222 kg/h of oxygen needed to be transferred with sole use of an injector, whereas in the case of the combined use of tube spargers and injector, the amount of oxygen needed to be transferred was only 200 kg/h.

In experiments in sewage treatment plants, for example in a sewage treatment plant for 12,000 population equivalents having a water depth of 2.5 m, the advantages of the inventive combination were still more clearly evident. Thus, for the same amount of dissolved oxygen, 304 kg/h of oxygen were required with sole use of tube spargers, and 162 kg/h of oxygen were required with sole use of an injector, but the same amount of dissolved oxygen was achieved by a transfer of only 108 kg/h of oxygen with combined use of tube spargers and injector.

What is claimed is:

1. A process for transferring an oxygen-containing gas into water or aqueous solutions in waste water treatment, which comprises adding the oxygen-containing gas to the water or aqueous solutions continuously or in intervals through an injector and simultaneously through at least one tube sparger, characterized in that pure oxygen is used as the oxygen-containing gas, and that a tube sparger is used which consists of a perforated elastomer tube, in which orifices for the outflow of the pure oxygen are not formed until an overpressure in the tube interior of at approximately 0.2 to 0.5 bar is reached.

2. The process as claimed in claim 1, wherein the oxygen-containing gas used is pure oxygen.

3. The process as claimed in claim 1, wherein the ratio of the volumetric flow rates of the oxygen or oxygen-containing gas added via the injector to the oxygen or oxygen-containing gas added via the tube sparger is 1:10 to 10:1.

4. The process as claimed in claim 1, wherein the volumetric flow rate of the oxygen or oxygen-containing gas added via the injector is 0.01 to 0.5 $m^3$ (S.T.P.)/h per $m^3$ of water or aqueous solution.

5. The process as claimed in claim 1, wherein the volumetric flow rate of the oxygen or oxygen-containing gas added via the tube sparger is 0.01 to 0.4 $m^3$ (S.T.P.)/h per $m^3$ of water or aqueous solution.

6. The process as claimed in claim 1, wherein the oxygen-containing gas or oxygen is fed to the wastewater in the activation stage in a biological wastewater purification plant.

7. The process as claimed in claim 6, wherein the water enriched with oxygen in the injector flows via one or more mixing nozzles into the tank containing the water lower in oxygen.

8. The process as claimed in claim 6, wherein the oxygen-enriched water is mixed with the tank water lower in oxygen via one or more mixing tubes.

9. The process as claimed in claim 6, wherein the oxygen-containing gas or oxygen is fed to the water or aqueous solution via a pipe from a network.

10. The process as claimed in claim 9, wherein the oxygen-containing gas of oxygen is fed to the wastewater in addition to the conventional aeration in the event of a higher pollutant loading of the wastewater or in the event of an increased energy requirement of the biological wastewater purification plant.

11. The process as claimed in claim 9, wherein the oxygen-containing gas or oxygen replaces the conventional aeration in the event of an increase in hydraulic loading of the biological wastewater purification plant.

12. The process as claimed in claim 6, wherein the oxygen-containing gas or oxygen replaces the conventional aeration for a period of 5 to 50 minutes per hour.

13. The process as claimed in claim 1, wherein the oxygen or oxygen-containing gas is added to the water or aqueous solution continuously.

14. The process as claimed in claim 1, wherein the oxygen or oxygen-containing gas is added to the water or aqueous solution at intervals.

15. The process as claimed in claim 1, wherein the oxygen-containing gas is added in intervals.

* * * * *